Feb. 14, 1939. J. H. MINER 2,147,495
ICE TRAY
Original Filed Sept. 18, 1935
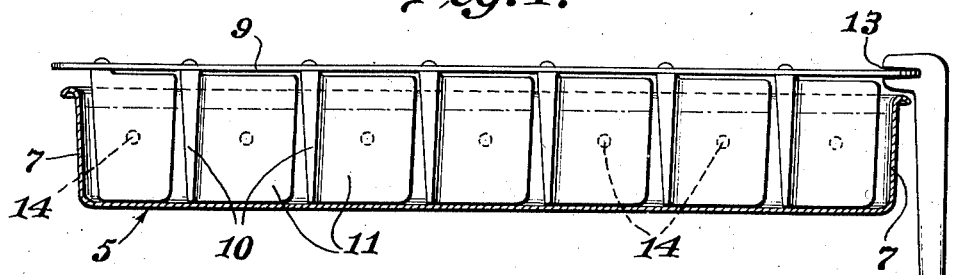
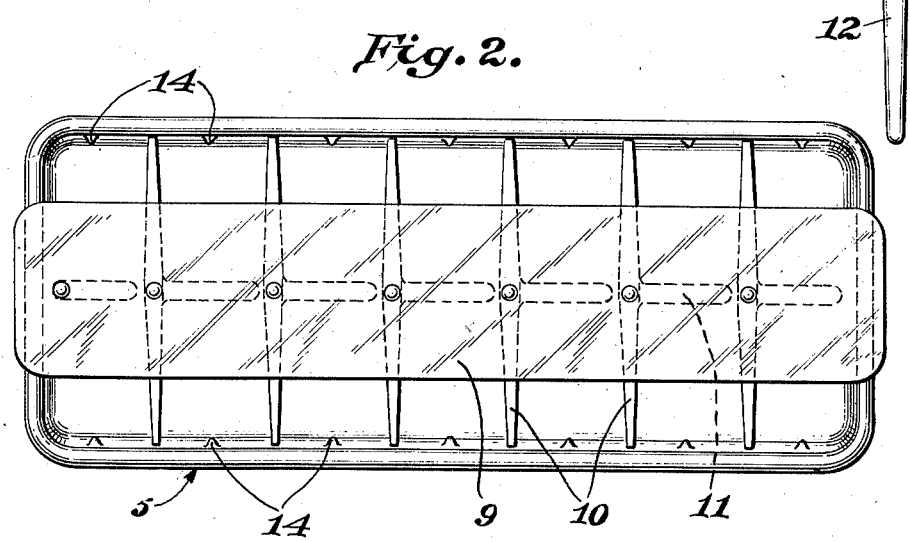
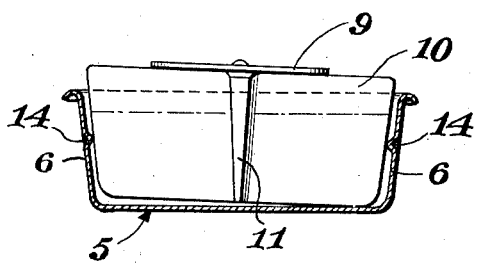 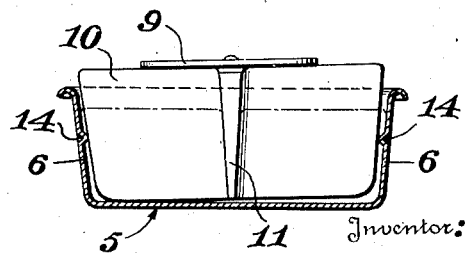
Inventor:
James H. Miner,
By Spear, Donellan & Hall
Attorneys Patented Feb. 14, 1939

2,147,495

UNITED STATES PATENT OFFICE 2,147,495

ICE TRAY

James H. Miner, Meridian, Miss., assignor to General Electric Company, a corporation of New York Application September 18, 1935, Serial No. 41,144
Renewed August 27, 1937

12 Claims. (Cl. 62—108.5)

My invention relates to freezing trays employed in refrigerating machines for producing ice, and more particularly to such trays having means including a grid therein for subdividing the contained ice into blocks or cubes.

In freezing trays of this type, it has generally been the practice to remove the ice and dividing means together from the tray. With such apparatus difficulty is then experienced in removing the ice from the dividing means. With the apparatus of the present invention, the ice remains in the tray upon the removal of the dividing means, and thereafter the ice may readily be removed from the tray.

It is an object of my invention to provide a freezing tray and a grid embodying an improved arrangement for facilitating the release of the grid from the freezing tray.

Another object of my invention is to provide an improved grid for freezing trays comprising a plurality of similar partition units of simple and economical construction.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a longitudinal sectional view of a freezing tray and a grid embodying my invention, these parts being shown in their relation preliminary to freeing the ice; Fig. 2 is a plan view of the freezing tray and the grid shown in Fig. 1; Fig. 3 is a transverse sectional view of the freezing tray and the grid showing the relation of these parts after a partial separation thereof; and Fig. 4 is a view of the freezing tray and the grid similar to that of Fig. 3 showing these parts in a different relation.

Referring to the drawing I have shown a freezing or ice tray 5 which may be of any desired shape, and as here shown for purposes of illustrating the invention, is of elongated narrow form with steeply sloping longitudinal sides 6. The freezing tray has end walls 7 which may be more nearly vertical, if desired. It is immaterial whether the tray is rigid as when it is made of glass or whether it is flexible as when made of thin metal. If the freezing tray is made of thin metal, however, an advantage is had in that the ice may be more easily freed by flexing the tray.

An arrangement including a grid is provided for subdividing the ice contained in the freezing tray into blocks or cubes and also for facilitating the removal of the ice blocks from the freezing tray. This grid comprises a longitudinal connector or carrier member 9, a plurality of transverse dividing walls or blades 10 depending from the under side of the carrier member and extending straight across the tray, and longitudinally extending dividing walls or blades 11 disposed between the transverse blades. The carrier member 9 is in the form of a strip narrower than the width of the top of the tray, but of such length that its ends overlie the end walls 7 of the tray. These overlying ends of the carrier member provide portions which may be gripped by a tool 12, for example, to remove the entire subdividing means from the tray. By forming the member 9 of less width than the width of the tray, the longitudinal sides of the tray are exposed so that the tray may be held down while the carrier member is being turned or twisted by the tool 12. The carrier member should be as flexible as possible but should be of such rigidity that it will not become permanently bent when it is being acted upon by the tool 12.

The transverse blades 10 depend perpendicularly from the carrier member in planes transverse to the length thereof and conform in shape to the interior cross-section of the tray. Each blade 10 is of downwardly tapered shape so that it may be easily removed from the ice. A feature of the invention is that these blades 10 are of greater height than the height of the tray, so that their uppermost portions are at a level above the top of the tray. As a result of this, the carrier member 9 attached to the tops of the blades 10, is spaced above the tray and the overlying ends of the carrier member are out of contact with the end walls 7 of the tray. This permits the tool 12 to be applied to an end of the carrier member 9, as shown in Fig. 1.

The longitudinal blades 11 are located centrally of the transverse blades 10. They taper downwardly in shape and are perpendicular relative to the carrier member 9, to facilitate their withdrawal from the ice. In order that these longitudinal blades will not prevent the free flexing of the carrier member 9, they are attached at only one of their sides. As here shown the blades 11 are each formed integrally with one of the transverse blades 10 and are free from but close to both the carrier member and the next transverse blade, as is best shown in Fig. 1. A transverse blade and its connected longitudinal blade form a group of connected blades or a partition unit of substantially T-shape independent of the other blade groups or partition units. These blade groups are arranged in juxtaposed relation and retained in assembled relation by the carrier member 9. It is apparent from this that the transverse blades are not connected together by the longitudinal blades nor are the transverse blades connected to the carrier member by the longitudinal blades. The carrier member can therefore flex as freely as though the longitudinal blades were not present. This arrangement provides for limited relative movements between the connected blade groups or partition units in order to facilitate the release of the ice blocks therefrom. It will be understood, however, that the longitudinal blades may form a slight connection between the transverse blades and the carrier member without departing from the spirit of the invention.

It is important to note that the endmost blade 10 and the endmost blade 11 are spaced inwardly from the ends of the carrier member so that these ends are free for the tool 12 to be applied thereto. Also a straight longitudinally extending blade is carried by the carrier member 9 adjacent the left-hand end thereof as shown in Figs. 1 and 2. It will be understood that this end blade is unconnected to the adjacent transverse blade in order to allow free flexing of the carrier member 9.

In freezing, the ice cannot come into contact with and become frozen to the carrier member 9 because of the elevated position of the carrier member. Only the blades can become frozen into the ice, and removal of the entire subdividing means is, to this extent, facilitated. To remove the subdividing means, the tool 12 is applied as shown in Fig. 1, and is given a back and forth turning or cranking movement to assure the positions in Figs. 3 and 4, while the tray is held stationary. This turning movement causes the blades to break loose from the ice while the ice remains partly adhered to the tray. The ice remains adhered to the tray because the ice has a greater surface contact with the tray than with the blades.

One convenient manner of effecting separation between the blades and the tray is to give the carrier member a turning movement while the tray is within the freezing compartment. Ordinarily the freezing compartment is of a size which would prevent complete rotational movement of the tray. By applying the tool to the carrier member and giving it a turn while the tray is still within the freezing compartment, the tray is first broken loose from the walls of the freezing compartment. Additional turning movement of the tool brings the tray into a position within the freezing chamber in which further turning of the tray is prevented by the walls of the freezing chamber, and thereafter the blades will be twisted from the ice in the manner already described.

It is important to note that the transverse blades are not all broken loose at once, but that they are successively broken loose, due to the twist which is possible between adjacent transverse blades resulting from the fact that they are not connected together or to the carrier member. The longitudinal blades are broken loose with the transverse blades to which they are attached. When the tool 12 is giving a turning movement, subtsantially the entire force is applied to the first transverse blade and its connected longitudinal blade because the carrier member can yield between the first and second transverse blades and the second blade and its connected longitudinal blade can remain in the ice. After the first transverse and longitudinal blades have been broken loose, substantially the entire force exerted is applied to the second transverse and longitudinal blades to break them loose, the flexing between the third and second transverse blades making this possible. In this manner, all the blade groups are individually broken loose, one after the other. Because the blade groups are individually broken loose and are not all broken loose at once, less force need be applied to effect removal of the blades. Only sufficient force has to be exerted to break loose one transverse and longitudinal blade at a time.

After all the blades have been broken loose in this manner the entire subdividing means may be removed from the tray. The ice within the tray is then left with relatively wide spaces at the points formerly occupied by the blades. The ice can therefore easily be removed by forcing the remaining ice blocks apart by a tool within the spaces between the blocks. Ordinarily, the twisting of the tool to remove the blades will also partly break the ice loose from the tray, and a slight blow upon the ice will then completely free the ice from the tray. Or, the tray may be twisted if it is capable of such distortion and this will break the ice loose from the tray.

While the ends of the carrier member 9 have here been shown as terminating over the end walls of the tray, it is apparent that the carrier member may be longer or shorter than here shown. It is only necessary that the ends of the carrier member extend to a point to be easily gripped by a tool, or to be otherwise manipulated.

If desired, projections 14 extending inwardly of the tray from the side walls 6, may be provided to engage with the ice and prevent upward movement of the ice with the blades. If these projections 14 are not provided and if an ice cube remains with the blades, this ice cube may be broken loose from the blades by inserting a tool in the space between the carrier member 9 and the top of the ice cube and forcing the cube out.

The present tool 12 has a lateral enlargement at the end opposite from the handle end, and this enlargement has a kerf or cross slot 13 to receive the end of the carrier member. Such a tool gives a considerable mechanical advantage. It will be understood, however, that any other suitable instrument may be used in place of the particular tool 12 here shown. For example an instrument may be inserted between an end of the carrier member and the top edge of the tray to exert a wedging or lever effect forcing the subdividing means upwardly.

While I have shown a particular embodiment of my invention, I do not desire my invention to be limited to the particular construction shown and described, and I intend in the appended claims to cover all modifications within the spirit and scope of my invention.

I claim:

1. Means for subdividing the contents of an ice tray at points for intended partition of the contents, comprising a longitudinal carrier member, a plurality of transverse blades depending therefrom and extending straight across the carrier member and tray, and projections extending from the blades longitudinally of the carrier member and lying perpendicularly to the carrier member, said projections being each connected to one of the blades but being free of the blade toward which it extends.

2. Means for subdividing the contents of an ice tray at points for intended partition of the contents, comprising a longitudinal carrier member, a plurality of transverse blades depending therefrom, and longitudinal blades disposed between the transverse blades and lying perpendicular to the carrier member, said longitudinal blades being connected at one of their sides only to the transverse blades to allow free flexing of the carrier member.

3. Means for subdividing the contents of an ice tray at points for intended partition of the contents, comprising a longitudinal carrier member, a plurality of transverse blades depending therefrom, and blades projecting from corresponding sides of the transverse blades and lying longitudinally of and perpendicular to the carrier member, said longitudinal blades being attached to the transverse blade from which they project but being free of the carrier member and other blades.

4. The combination with an ice tray, of removable means for subdividing the contents thereof, said means comprising a plurality of upright blades lying transversely within the tray, and a plurality of upright blades lying longitudinally of the tray and each connected to one only of the transverse blades, and a carrier member to which only the transverse blades at their upper portions are connected, said carrier member overlying an end wall of the tray, said transverse blades being higher than the height of the tray whereby the carrier member is spaced above the top of the tray with the overlying end of the carrier member out of contact with the end wall of the tray.

5. The combination according to claim 4 in which the blades are disposed inwardly from the ends of the carrier member to provide free end portions of the carrier member to be gripped in manipulating the subdividing means.

6. In combination with an ice tray, a grid comprising a longitudinal connector and a plurality of similar partition units relatively movable with respect to each other and depending from said connector, each of said partition units including a dividing wall adapted to extend transversely across the tray and a dividing wall adapted to extend longitudinally of the tray and carried by said first-mentioned dividing wall intermediate the ends thereof, said partition units being otherwise unconnected between themselves to allow free relative movements therebetween.

7. In combination with a freezing tray, a grid comprising a plurality of similar partition units, each of said partition units including a transverse dividing wall adapted to extend across the tray and a longitudinal dividing wall carried by one side of said transverse dividing wall intermediate the ends thereof, said partition units being arranged in juxtaposed relation, and means including a connector for retaining said partition units in assembled relation and for accommodating limited relative movement therebetween, said longitudinal dividing walls of said partition units being unconnected between themselves and unconnected at their lower ends to said connector to allow free relative movements between said partition units.

8. A grid for freezing trays comprising a plurality of similar partition units, each of said partition units including a transverse dividing wall and a longitudinal dividing wall carried by one side of said transverse dividing wall, said partition units being arranged in juxtaposed relation, and means including a connector secured to said transverse dividing walls of said partition units for retaining said partition units in assembled relation and for accommodating limited relative movements therebetween, said longitudinal dividing walls of said partition units being unconnected between themselves and unconnected to said connector to allow free relative movements between said partition units.

9. A grid for freezing trays comprising a plurality of similar substantially T-shaped partition units, said T-shaped partition units being arranged in juxtaposed relation with the stems of said T-shaped partition units extending in the same direction and in substantial longitudinal alignment, and means including a connector secured to said partition units for retaining said partition units in assembled relation and for accommodating limited relative movements therebetween, the stems of said T-shaped partition units being unconnected between themselves and unconnected to said connector to allow free relative movements between said partition units.

10. In combination with a freezing tray, a grid comprising a plurality of substantially T-shaped partition units arranged in juxtaposed relation, a flexible connector, and means for securing said partition units to said connector at spaced apart intervals along its length and for affording flexing of said connector substantially throughout the length thereof.

11. A grid for freezing trays comprising a plurality of similar partition units arranged in juxtaposed relation, each of said partition units including a plurality of dividing walls connected together, and means including a flexible connector secured to said partition units for retaining said partition units in assembled relation and for accommodating limited relative movements therebetween, at least one of the dividing walls of each of said partition units being unconnected to said connector to allow free relative movements between said partition units.

12. A grid for freezing trays comprising a plurality of similar partition units arranged in juxtaposed relation, each of said partition units including a plurality of dividing walls connected together, and means including a flexible connector secured to said partition units for retaining said partition units in assembled relation and for accommodating limited relative movements therebetween, a corresponding one of the dividing walls of each of said partition units being unconnected to said connector to allow free relative movements between said partition units.

JAMES H. MINER.